Dec. 15, 1959 G. M. WOLFF ET AL 2,917,570
COMPOSITE MICA PAPER, MICA FLAKE ELECTRICAL INSULATING MATERIAL
Filed April 25, 1957
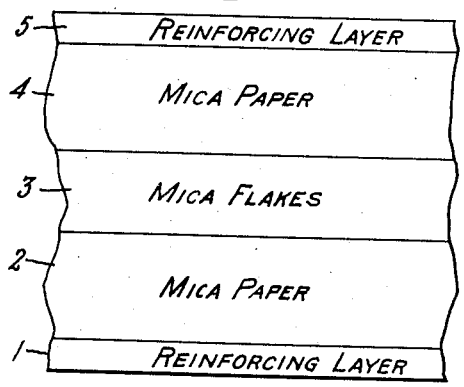
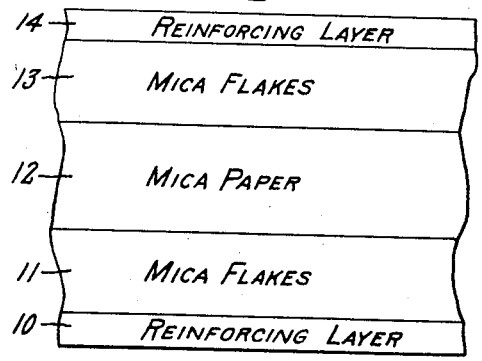
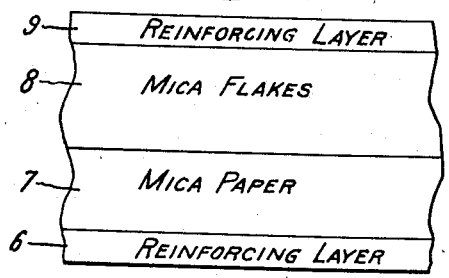
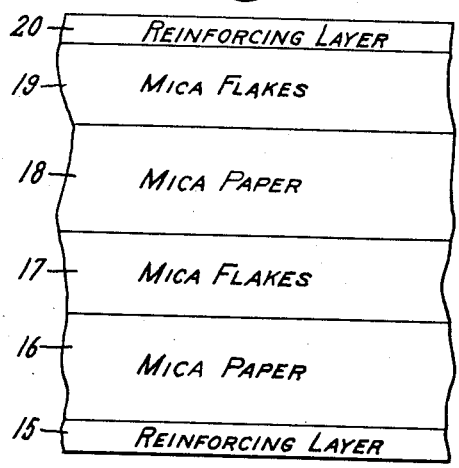
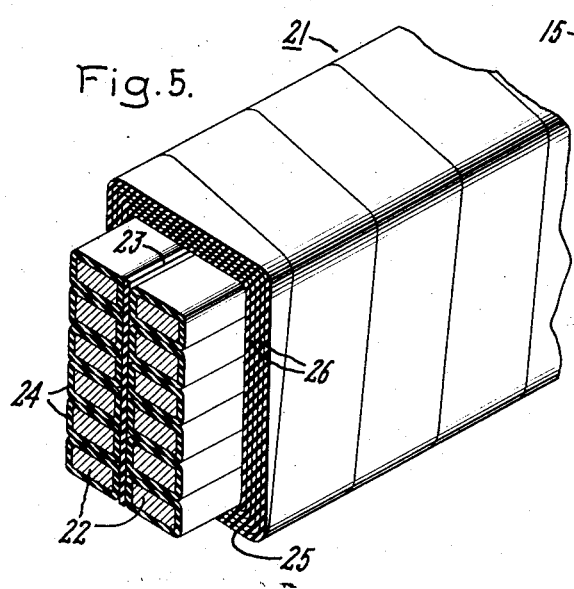
INVENTORS
GEORGE M. WOLFF
CHARLES D. RICHARDSON
BY
THEIR ATTORNEY

United States Patent Office 2,917,570
Patented Dec. 15, 1959

2,917,570

COMPOSITE MICA PAPER, MICA FLAKE ELECTRICAL INSULATING MATERIAL

George M. Wolff, Scotia, and Charles D. Richardson, Ballston Lake, N.Y., assignors to General Electric Company, a corporation of New York Application April 25, 1957, Serial No. 654,718

10 Claims. (Cl. 174—120)

This invention relates to composite electrical insulating material and to its method of manufacture. More particularly, it relates to such insulating materials which are simple in structure and contain a desirable amount of effective insulating material, which are easily applied and permit the ready use of mica mat or paper in wrap-type insulation.

Mica mat or paper is a paper or cardboard-like material which is made by splitting micaceous material into tiny flakes or platelets which are then laid down in paper-making fashion to form a mica sheet material or paper. The preparation of such mica paper is described, for example, in Patents 2,549,880; 2,614,055; and 2,709,158, which are by reference made a part of this application. Generally, the mica paper is impregnated with a resin, and preferably in the uncured or semi-cured state, used as a wrap-type insulation which is fully cured in place. While the resin-impregnated mica paper is strong enough for many insulating purposes, it is generally too weak to withstand the physical handling and stresses involved in forcibly wrapping such electrical assemblies as conductor bars and the like. In cases where the mica paper is subjected to stress and strain, it has become customary to reinforce the mica paper with a fibrous material, such as cellulose paper or tissue, which may be further reinforced with longitudinally disposed glass fibers. The mica paper can also be reinforced with glass fiber, asbestos or synthetic cloth or mat. However, such reinforcement, as with tissue, or cloth or mat, adds little or nothing to the electrical insulating ability of the mica itself. On the other hand, since the reinforcing layers are normally 1 mil or more thick, they do add bulk to the mica paper, which may itself typically range from 2 to 5 mils thick, thus taking up much space with little or no electrical advantage. Thus, if 18 layers of paper reinforced mica paper are used as insulation with the mica paper being 3 mils thick and the fibrous reinforcement 1 mil thick on each side, out of a total thickness of 90 mils of insulation, 36 mils or 40 percent of the total insulation thickness would be reinforcement. Where glass or other fabric is used as the reinforcement, the voids therein must be carefully filled with resin and, in any case, where either glass fabric or impregnated paper or asbestos cloth is used, since the dielectric strength of the impregnated reinforcing material is less than that of the mica paper or micaceous material, it represents a weak point in the insulation which is susceptible to failure under voltage. Even where the reinforcement is used on only one side of the mica paper, the extra space taken up without other advantage is still substantial.

Another disadvantage of mica paper is the fact that it swells or increases its thickness up to about one-third or more when it is impregnated with resin-solvent compositions. When this impregnated material is wrapped around a rectangular-shaped conductor bar array in more than about two thicknesses and cured under pressure as in a pressure tank as described in Patent 2,707,204, assigned to the same assignee as this invention, or between pressure plates, it shrinks due to the loss of the solvent and the pressure exerted thereon. This shrinking, combined with the fact that the paper does not conform strictly to the outline of the bar being wrapped, results in undesirable wrinkles along the sides or edges of the bar, or in projections of the mica material at the corners of the bar, or both, making difficult the precision wrapping thereon of additional insulation. While additional resin is usually used between the layers of insulation, the wrinkles and other unevenness in the layers further reduce the life of the insulation under electrical stress and make impractical the proper fitting of the insulated bar in its slot. In addition to its relatively poor electrical performance as compared to the mica paper, cellulosic tissue tends to puff up or expand, and to carbonize at elevated temperatures of the order of 115° C., at which electrical apparatus often operates.

A principal object of this invention is to provide insulating tape or sheet material incorporating mica paper in which the proportion of reinforcing material is substantially reduced. Another object of the invention is to provide an insulating tape or sheet utilizing mica which is readily conformable to the periphery of conductor bars or rectangular structures without wrinkling or the creation of voids.

A further object is to provide insulating tape or material which provides greater insulating ability per unit thickness, and hence permits the use of less insulation for a particular machine, or permits reduction of the physical size of machine for a particular rating, or permits an increase in the voltage for a particular thickness of insulation resulting in higher machine ratings.

Briefly stated, the invention comprises insulating material in which various combinations of mica paper and mica flakes are made into layered or laminated tapes or sheets which have a fibrous reinforcement only on one or both of the outer surfaces. By the invention, excessive reinforcement which adds little to the insulating quality of the tape is eliminated, and an insulation incorporating readily available and economical mica paper is provided which conforms readily to the shape being wrapped, and reduces substantially the thickness of insulation required for a particular voltage stress, as compared to the use of individual tapes of mica flakes and mica paper. It will be seen that by using the present insulating material, the number of separate layers of material which need be applied is drastically reduced as well as the time and labor required to apply the insulation.

The features of the invention which are believed to be novel are set forth with particularity in the claims appended hereto. The invention, however, will be better understood both as to its organization and method of operation, and further objects and advantages appreciated, by reference to the following description and the drawing, in which Figs. 1 through 4 are cross sectional views of typical insulating material made according to the invention, and Fig. 5 shows a cross sectional view of a conductor bar insulated according to the invention.

Referring to Figs. 1 through 4, there are shown several exemplary tape or sheet structures of this invention, it being realized that reference to tape also includes sheet material. In general, the close-fitting, non-wrinkling insulation comprising mica paper and having a minimum of reinforcing material, which is the subject of this invention, is prepared by forming a composite tape of mica paper and mica flakes with an outer reinforcement, the mica flakes and mica paper laminae being arranged in any desired manner without intervening reinforcement which is found to be unnecessary, as opposed to when separate tapes of mica flake or mica paper are used.

Preferably, the laminae are separately impregnated with resin before they are assembled, although they can also be merely given an adhesive coat of resin to cause the layers to adhere one to the other, and then later given an impregnating resin treatment just before or during final use. Likewise, the tape as completed can, if desired, be partially cured to a substantially tack-free state which will allow the tape to be wound upon itself and stored until final use and cure on the structure to which it is applied.

In forming the present insulating material, the various laminae are impregnated or coated with resin in any well-known manner and pressed or passed between rolls to form a unitary structure. Thus, referring to Fig. 1, a reinforcing fibrous layer 1 of glass cloth, asbestos cloth and the like, impregnated or coated with a resinous material, has superimposed upon it a layer 2 of mica paper prepared, for example, as in the above referred to patents. There is next deposited on the free surface of the mica paper a layer 3 of mica flakes. These flakes are laid by hand in overlapping fashion, on the mica paper, or dropped or blown thereon mechanically in such a manner that few or no voids are left in the layer. Conveniently, the flakes or the mica mat are treated with resinous material, so that they will cohere. Next, another layer 4 of resin-coated or impregnated mica paper is laid on the mica flake layer 3, and finally a second outer reinforcing layer 5 of fibrous material similar to layer 1 is mounted on the last mica paper layer. It has been found that for some purposes, one of the reinforcing layers next to the mica paper layer 2 can also be eliminated.

It has been found that when the composite laminated structure is pressed through rollers or otherwise compressed to promote coherence of the layers, the mica paper layer actually appears to conform closely to the adjoining mica flake layers. Typically, the outer reinforcing layer for all of the material described herein is about one mil thick. The mica paper usually ranges from about 2 to 5 mils thick, or more, and the mica flake layer when hand-laid may be from about 3 mils thick upward. When the mica flake layer is mechanically laid, it is typically about 5 or 6 mils thick upward. If the reinforcing layers of the structure of Fig. 1 are one mil thick, the mica paper is 4 mils thick and the mica flake layer 3 mils thick, the total thickness of the structure is 13 mils. Following the prior art practice of using separate reinforced tapes of mica paper and mica flakes, a comparable structure would be 17 mils thick, having disposed therein 4 mils of fibrous material which is much less effective in an electrical sense than the mica paper or mica flake, and in many cases, especially at high temperatures, promotes electrical breakdown.

It has been found in actual practice that, whereas when about two or more adjacent layers of individual mica paper tapes are wrapped upon a structure in normal, partial overlapping fashion, such as a conductor bar, and cured, the mica paper layers wrinkle, making difficult the accurate fitting of the insulated bar in its slot. When one or more mica flake layers are placed between the layers of mica paper, the mica flake layers tend to compress the mica paper in a uniform manner under pressure, so that wrinkles and voids are minimized or obviated. It will be realized that besides being unworkmanlike and space-consuming, the wrinkling and voids which occur with prior art material must be filled in with resin, which is itself inferior electrically to the micaceous material, such as mica paper and mica flakes. Generally, such a tape as that above would be cured in place after several layers had been applied to the structure being insulated, so that the above benefit of the mica flake layers could be realized to the fullest extent.

Shown in Fig. 2 is a variation of the structure of Fig. 1, using only one layer 7 of mica paper, and a layer 8 of mica flakes, sandwiched between reinforcing layers 6 and 9. As a matter of convenience, a structure of this type would be generally be cured after at least several layers had been applied to the structure to be insulated, although it could as well be cured layer by layer, the mica flake layer insuring that the mica paper layer is evenly distributed over the structure after cure and the entire insulation void-free. Here assuming that the mica flake layer, mica paper layer, and reinforcing layer are respectively 4 mils, 3 mils and 1 mil thick, the present material eliminates 2 mils of reinforcing material and provides in 9 mils an insulation which is equivalent to or better than 11 mils of the prior art insulation. If reinforcing layer 6 is eliminated, as it may in some cases, the over-all thickness is still further reduced.

Shown in Fig. 3 is another typical insulating material which can be made according to this invention. Here there are successively laid on a reinforcing layer 10, a layer 11 of mica flakes, a layer 12 of mica paper, a layer 13 of mica flakes, and a final layer 14 of reinforcement, eliminating four layers or 4 mils of reinforcement, and, by using a higher percentage of micaceous material, providing better insulating protection. Usually, tapes or sheets such as those shown in Fig. 3 are again cured after several or more layers have been wound on the conductor assembly. It will be seen that where the reinforcing layer, mica flake layers, and mica paper layers are 1, 3 and 4 mils thick, 4 mils of reinforcing layers are eliminated from the structure of Fig. 3, reducing the thickness of the material from 16 mils to 12 mils.

Fig. 4 illustrates another variation of the insulating material of this invention, in which the reinforcing layer 15 has laid upon it respectively a layer 16 of mica paper, a layer 17 of mica flakes, a layer 18 of mica paper, a layer 19 of mica flakes, and a layer 20 of reinforcing fibrous material. It will be seen that in a total thickness of 16 mils, six sheets or six mils of reinforcing fibrous material, are eliminated. This means a substantial space saving of 28 percent per layer, based on the prior art thickness of 21 mils where separate reinforced mica paper and mica flake tapes are used. Conversely, it means that where provision has already been made for the thicker insulation, additional mica paper or mica flake layers can be added and the voltage rating of the conductor bar and the power rating of the machine in which they are mounted raised.

There have been presented above exemplary insulating tape or sheet structures which illustrate the savings and improvements which can be realized by this invention. Other combinations of mica flake and mica paper will occur to those skilled in the art and are to be considered within the scope of this invention.

Referring to Fig. 5, there is shown a cross-sectional view of a conductor bar or winding further illustrating the practice of the invention. The bar 21 comprises a plurality of wires or conductors 22 of metal arranged in tiers spaced by a separator 23, which may be typically a glass-asbestos-resin bonded composition, or a cured thermosetting resin. Each conductor 22 is also insulated from the adjacent conductor as with insulation 24 which, if a thermosetting resin, for example, can be applied in any way as by dipping, spraying, painting, etc. The thermosetting resin can be any of the adhesive resins well known to those skilled in the art, including but not limited to epoxy resins, silicones, polyesters, phenolics, and the like, or mixtures of such materials, and may be used alone or in conjunction with fibrous insulation, such as asbestos, glass, etc. In some instances, fibrous material alone is used for this turn insulation. The ground insulation 25 surrounds the entire insulated conductor array and comprises a plurality of layers 26 of the material of this invention. If tape is used, it is wound in partial overlapping fashion on the conductor array. If a sheet is used, it, too, is overlapped with similar or other tape or sheets wherever joining is necessary. As pointed out, the material is preferably impregnated with a thermosetting resin as above, which is either uncured or semi-cured. If the laminae of the tape are not fully impregnated, there is provided between the layers enough of the resin to cement or hold them together. If the laminae of the tape are fully impregnated, several layers of the tape are applied and then cured. If the tape is not initially fully impregnated, after one or more layers are applied, it is treated with further resin at ordinary pressures or at elevated pressures, to impregnate the structure, the amount of pressure, if any, depending upon the particular tape structure, the viscosity of the resin solution, the prior resin treatment, etc. After curing any layer or sets of layers, additional layers are added as required to attain the proper insulating quality.

The curing can be carried out in any usual well-known manner. For example, the winding can be placed in a suitable mechanical mold which is heated to effect the cure. Alternatively, the winding can be wrapped in a sacrifice tape which has the ability, on heating, to shrink and thus exert pressure upon the winding array during the cure. Typically, a sacrifice tape, for example, cotton cloth or glass cloth, can also be wrapped around the insulation and the whole placed in a tank which is under vacuum to remove volatile materials or solvents from the assembly. Thereafter molten asphalt, bitumen or other pressurizing fluid is placed in the tank and heated to an elevated temperature, and pressurized to cure the resin in the winding. The sacrifice tape is then stripped from the winding. This cycle of taping, placing in a tank, evacuating, heating, pressurizing and stripping is repeated as required until the desired build-up of insulation is attained, dependent upon the voltage to which the insulation is to be subjected. A combination of the above curing methods can also be used, such as curing the straight or uniform portions of the winding in a mechanical mold under pressure, and then curing the odd-shaped or curved end portions in a tank. Alternatively, the entire winding can be placed in a resinous envelope which will allow the escape of volatile materials therefrom but block the ingress of the pressurizing liquid used in the curing tank. Other means of curing the insulating material will occur to those skilled in the art, the precise method of curing not being critical.

There is provided by this invention a composite insulating material which eliminates a substantial amount of reinforcing material. Since this reinforcing material is generally inferior to the preferred mica paper or mica flake material used, more insulating protection is provided in less space than has been realized heretofore for a particular voltage. Conversely, using the present materials, the voltage rating of any particular thickness of insulating material, and hence the power rating of the machine in which it is used, can be raised. The use of mica flakes in cooperation with mica paper exerts during wrapping and cure an even pressure on the mica paper, preventing the formation therein of wrinkles or projections with their accompanying voids. The use of the present composite material as opposed to separate mica flake and mica paper tapes, which are separately reinforced, further makes possible the insulation of materials in much less time and more economically. The terms "tape" and "sheet" are used interchangeably herein, reference to one being taken to include the other.

What we claim as new and desire to secure by Letters Patent of the United States is:

1. An electrical insulating tape comprising in combination outer layers of reinforcing material and inner layers consisting of at least one layer of mica flakes and at least one layer of mica paper.

2. An electrical insulating tape comprising outer layers of reinforcing material and inner layers consisting of at least one layer of mica flakes and at least one layer of mica paper, said tape being impregnated with a curable resinous material.

3. An electrical insulating tape consisting of outer layers of fibrous material and an inner structure consisting of alternate layers of at least one layer of mica flakes and at least one layer of mica paper.

4. An electrical insulating tape comprising outer layers of fibrous cellulosic material and disposed therebetween at least one layer of mica flakes and at least one layer of mica paper.

5. An electrical insulating tape comprising outer layers of fibrous glass material and inner layers consisting of at least one layer of mica flakes and at least one layer of mica paper.

6. An electrical insulating tape comprising outer layers of fibrous cellulosic material reinforced with glass fibers and disposed therebetween at least one layer of mica flakes and at least one layer of mica paper.

7. An electrical conductor having an insulation therefor electrical insulating material consisting of a plurality of layers of insulating material each comprising a reinforcing layer having superimposed thereon at least one layer of mica flakes and at least one layer of mica paper arranged in alternating fashion.

8. An electrical conductor having as insulation therefor electrical insulating material consisting of a plurality of layers of insulating material, each layer comprising outer reinforcing layers having interposed therebetween at least one layer of mica flakes and at least one layer of mica paper arranged in alternating fashion.

9. An electrical assembly having as insulation therefor electrical insulating material consisting of a plurality of layers of insulating material each comprising a reinforcing layer having superimposed thereon at least one layer of mica flakes and at least one layer of mica paper arranged in alternating fashion.

10. An electrical insulating tape comprising a reinforcing layer having superimposed thereon at least one layer of mica flakes and at least one layer of mica paper.

References Cited in the file of this patent

UNITED STATES PATENTS

| | | |
|---|---|---|
| 2,614,055 | Senarclens | Oct. 14, 1952 |
| 2,707,204 | Richardson et al. | Apr. 26, 1955 |
| 2,763,315 | Berberich et al. | Sept. 18, 1956 |

UNITED STATES PATENT OFFICE

CERTIFICATE OF CORRECTION

Patent No. 2,917,570                                            December 15, 1959

George M. Wolff et al.

It is hereby certified that error appears in the printed specification of the above numbered patent requiring correction and that the said Letters Patent should read as corrected below.

Column 6, line 31, for "having an" read -- having as --.

Signed and sealed this 14th day of June 1960.

(SEAL)
Attest:

KARL H. AXLINE
Attesting Officer

ROBERT C. WATSON
Commissioner of Patents